March 16, 1948. W. O. BENNETT, JR 2,437,929
TIMING APPARATUS
Filed June 18, 1941 6 Sheets-Sheet 1
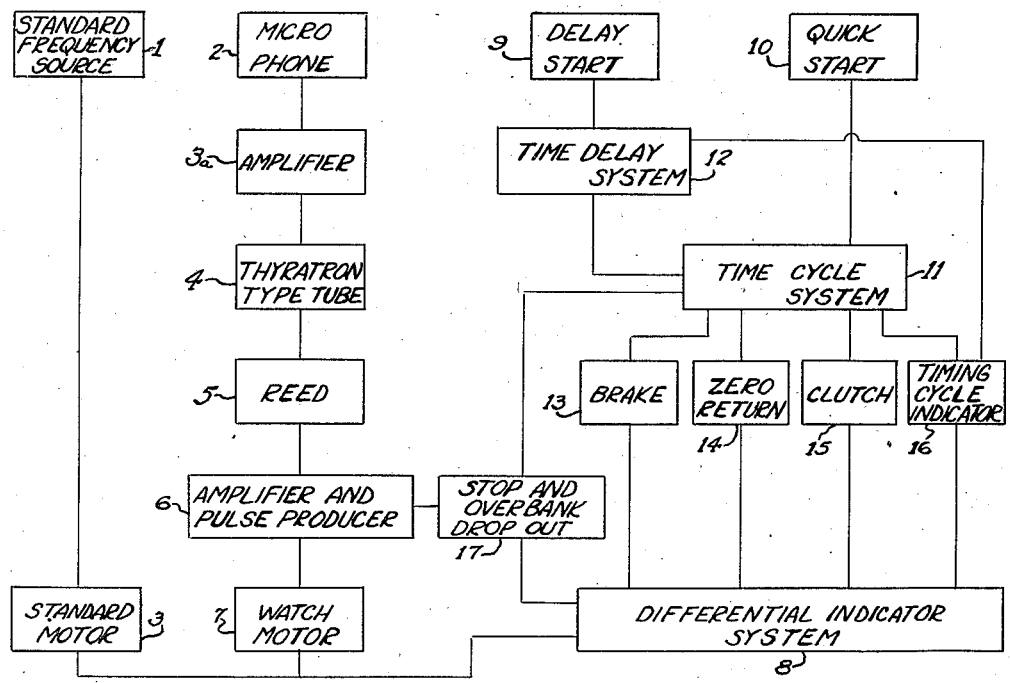
Fig. I
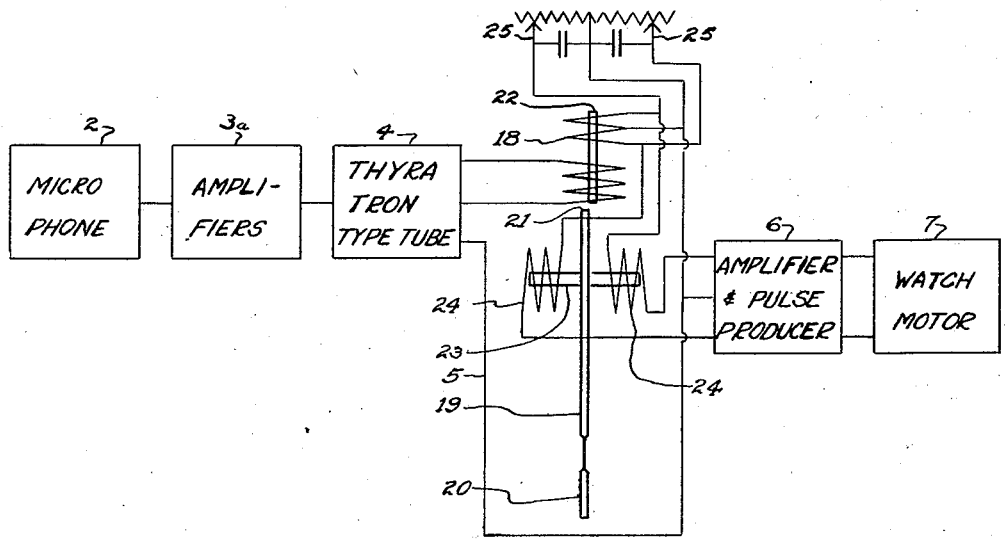
Fig. II
INVENTOR
WILLIAM. O. BENNETT JR.
BY James M. Heitman
ATTORNEYS.

March 16, 1948.   W. O. BENNETT, JR   2,437,929
TIMING APPARATUS
Filed June 18, 1941   6 Sheets-Sheet 2
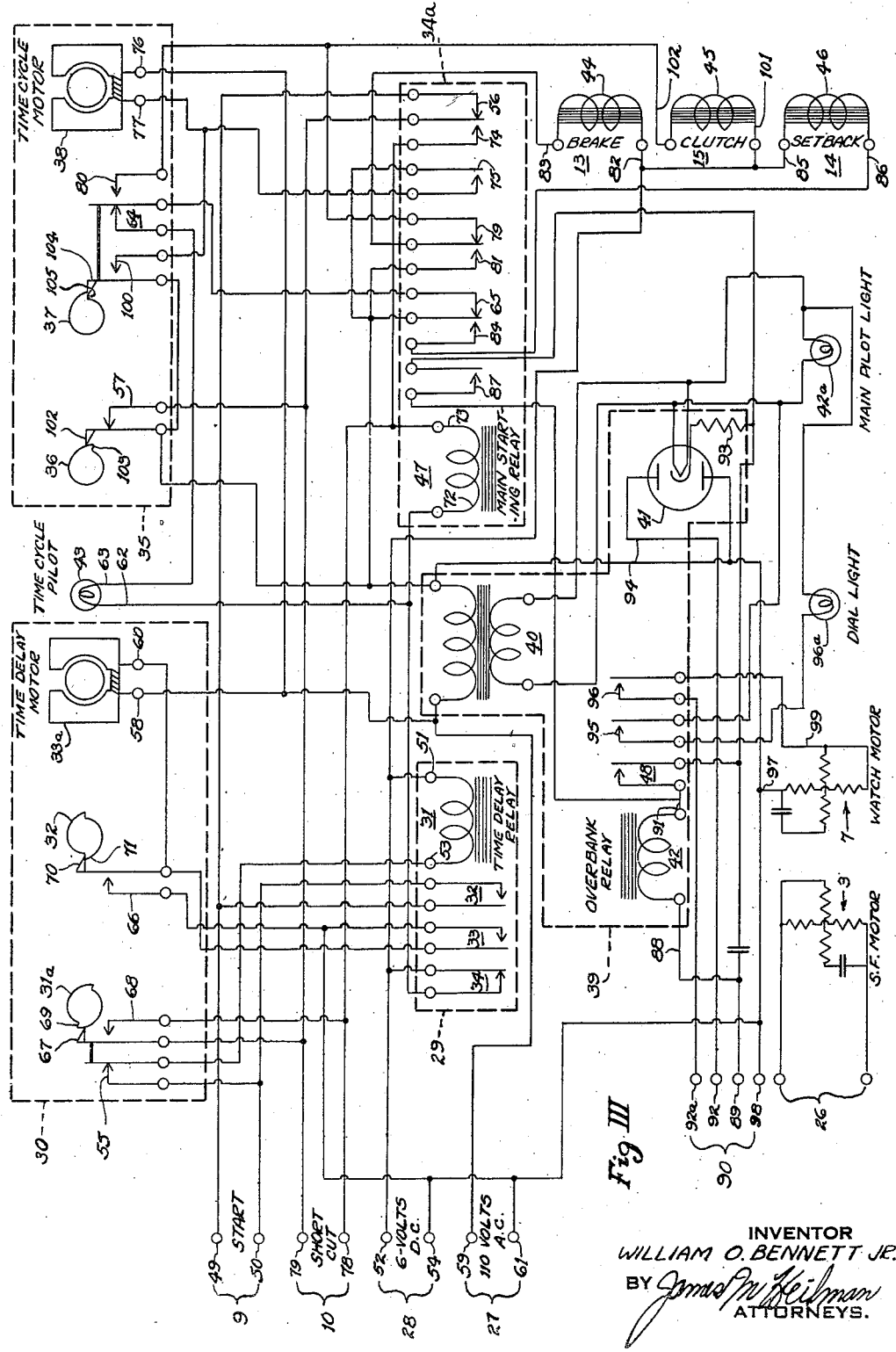
Fig. III
INVENTOR
WILLIAM O. BENNETT JR.
BY James M. Heilman
ATTORNEYS.

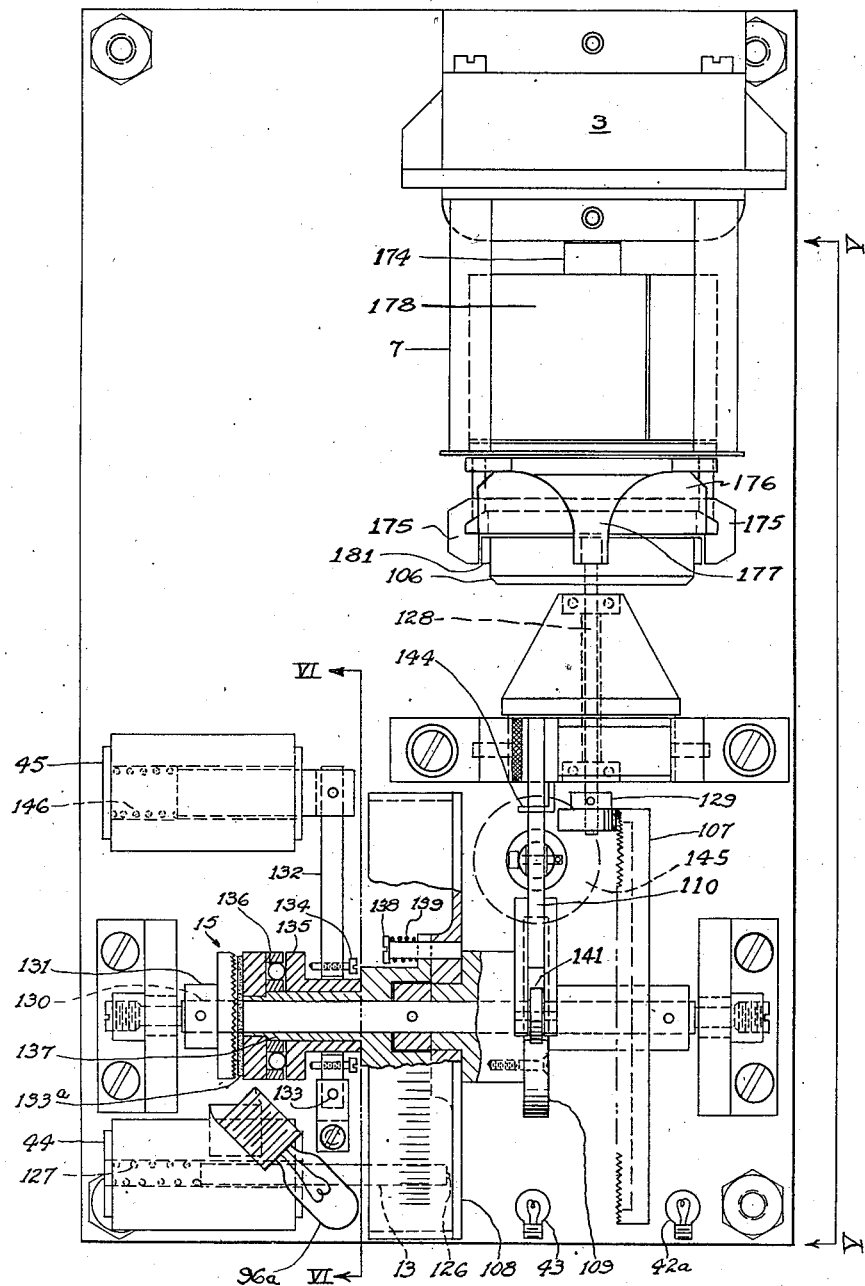
Fig IV

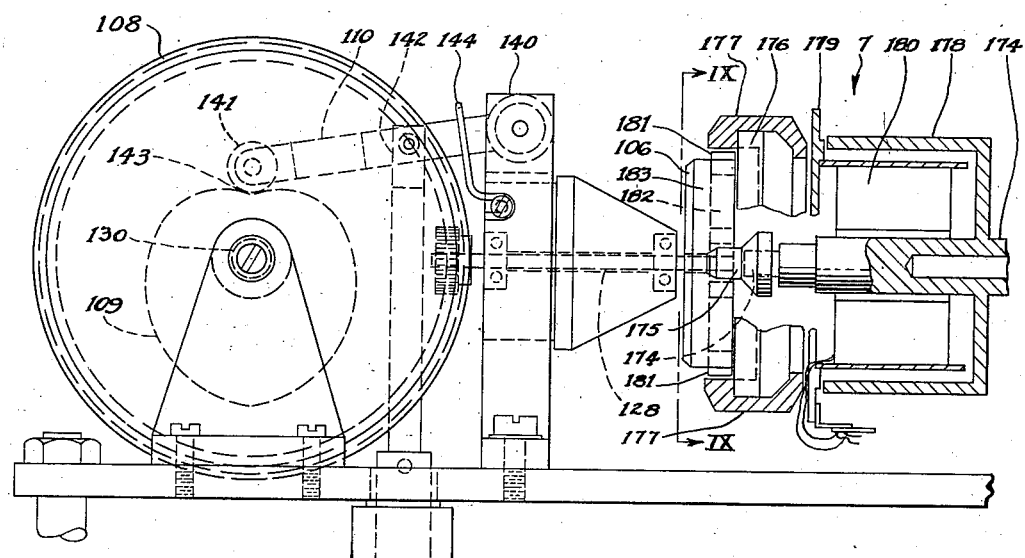
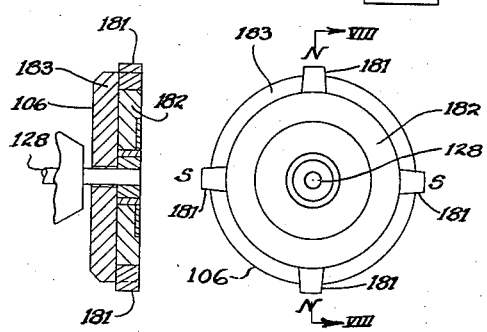
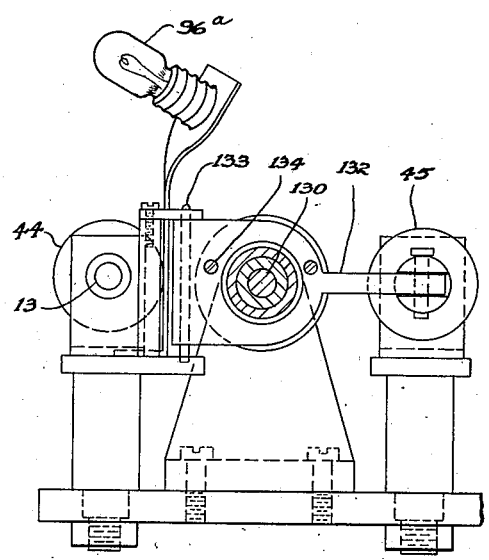
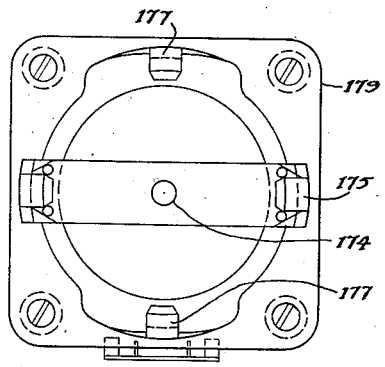

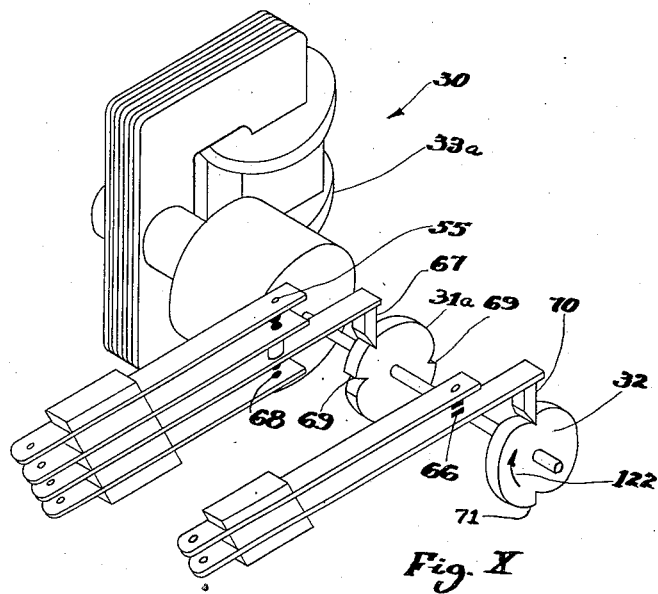
Fig. X
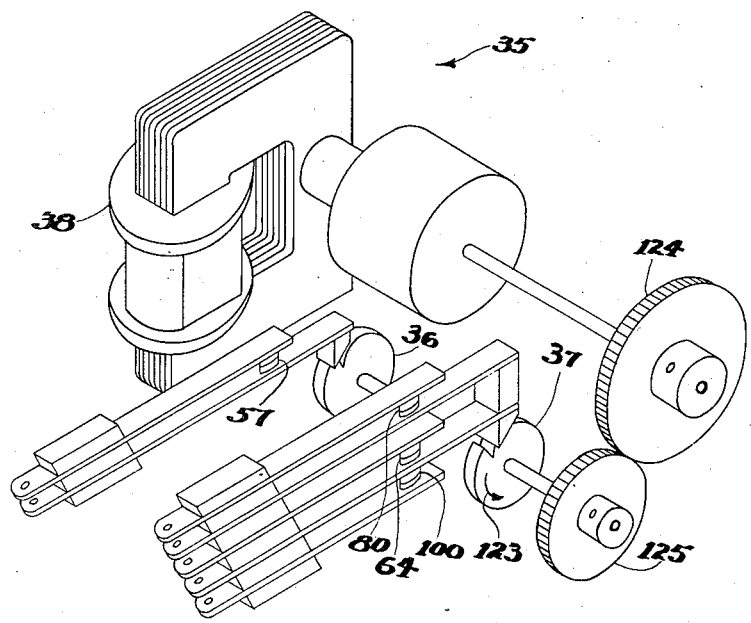
Fig. XI
INVENTOR
WILLIAM O. BENNETT JR.
BY James M Heilman
ATTORNEYS.

March 16, 1948.                W. O. BENNETT, JR                    2,437,929
                                 TIMING APPARATUS
                               Filed June 18, 1941                6 Sheets-Sheet 6
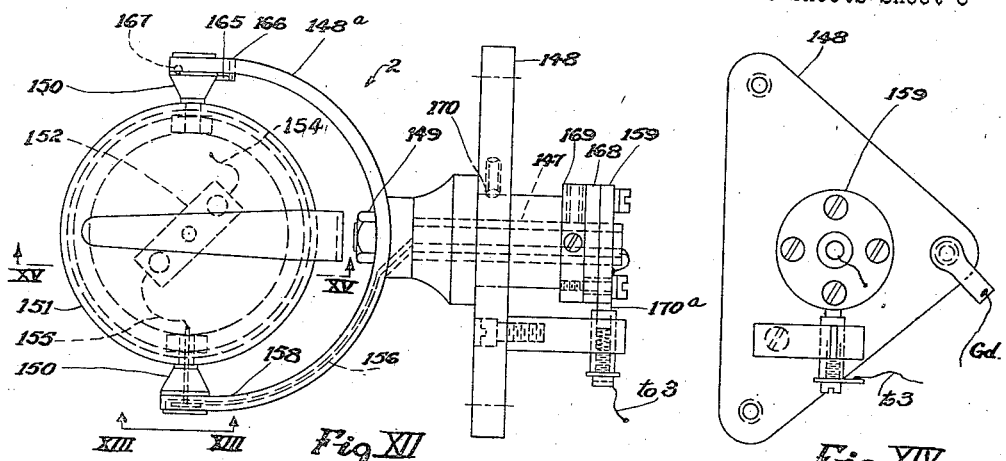
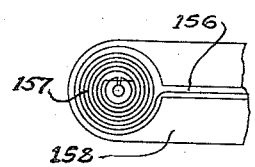
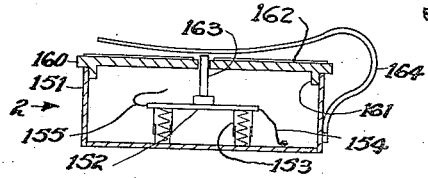
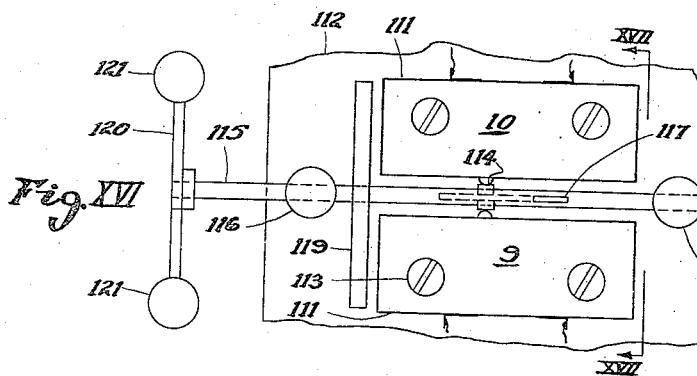
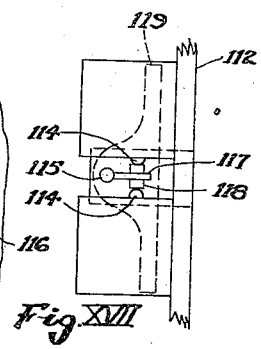
INVENTOR
WILLIAM O. BENNETT JR.
BY James M. Heitman
ATTORNEYS.

Patented Mar. 16, 1948

2,437,929

UNITED STATES PATENT OFFICE 2,437,929

TIMING APPARATUS

William Ogle Bennett, Jr., Lancaster, Pa., assignor to Hamilton Watch Company, Lancaster, Pa.

Application June 18, 1941, Serial No. 398,633

4 Claims. (Cl. 73—6)

An object of this invention is to provide improved means for and method of determining a relative rate of operation of a device by determining the differential or lack of differential between given electric current frequencies when one of said frequencies is governed by the rate of the device.

Another object is to provide improved means for and method of comparing an electric current whose frequency is governed by sounds with an electric current of standard frequency and automatically achieving an indication of the result of the comparison by operating a mechanical device with each of the currents and comparing the speeds of said devices.

Another object is to provide a timepiece rate testing device including a stabilizer adapted to produce uniform electrical impulses from irregular timepiece sound governed electrical impulses.

Another object is to provide a timepiece rate testing device which automatically carries out a test over a predetermined time interval, automatically causes an indicator member to provide a direct indication of the result of the test, and automatically maintains said indicator member in its result indicating position.

Another object is to provide a timepiece testing device which is adapted to carry out a rate test with the timepiece under test in any one of, or any variety of, a universal series of positions, while maintaining unchanged the position of the timepiece on its immediate support.

Another object is to provide an improved microphone support which is so formed as to permit universal movement of the microphone.

Another object is to provide means for and method of changing low frequency direct current pulses to alternating current by means of a mechanical vibrator member adapted to be readily driven off its natural vibration frequency.

Another object is to provide means for producing an electric current of a stabilized frequency which is governed by and in step with the intermediate sounds of a timepiece.

Another object is to provide, in an electric current frequency comparison device, a warning indication operable when and if one of the frequencies departs from given limits.

Another object is to provide improved means and method of automatically carrying out a timepiece rate test over a predetermined time period, and automatically providing a direct indication of the result of the test.

Another object is to provide a timepiece rate testing device which automatically delays operation a sufficient length of time to permit stabilization and synchronization of the operation of the timepiece and the testing device.

Other objects and advantages of the invention will become apparent from the following description taken in connection with the accompanying drawings. It will be seen that many changes may be made in the details of construction, arrangement of parts and method shown and described without departing from the spirit of the invention as expressed in the accompanying claims. I, therefore, do not wish to be limited to the exact details of construction, arrangement of parts and steps of the method shown and described, since one form only has been shown by way of illustration.

Referring to the drawings:

Fig. I is a schematic block diagram illustrating the operation of the device embodying the invention;

Fig. II is a schematic partly blocked diagram with the arrangement of the stabilizing vibrator reed portion of the device shown in Fig. I illustrated in detail;

Fig. III is a schematic diagram of the control circuits of the invention;

Fig. IV is a plan view of the jointly operated motors and the differential indicating mechanism of the invention;

Fig. V is a partial side elevation taken in the direction of the arrows V—V in Fig. IV;

Fig. VI is an illustrative view taken on line VI—VI of Fig. IV the assembly being turned and rotated through 90° with respect thereto;

Fig. VII is a view of the rotor 183 of Fig. V;

Fig. VIII is a section on line VIII—VIII of Fig. VII;

Fig. IX is a view taken along IX—IX of Fig. V without showing the rotor;

Fig. X is a perspective view of the time delay system including motor, switches, and cams;

Fig. XI is a perspective view of the timing cycle system including motor, gearing, switches, and cams;

Fig. XII is a plan view of the microphone assembly;

Fig. XIII is an enlarged partial view of Fig. XII taken on line XIII—XIII;

Fig. XIV is an end elevation of Fig. XII;

Fig. XV is a section taken on line XV—XV of Fig. XII;

Fig. XVI is a plan view of the control switch assembly;

Fig. XVII is an end elevation of Fig. XVI taken on line XVII—XVII; and

Fig. XVIII is a side elevation of the stabilizing vibrator reed which is illustrated schematically in Fig. II.

This invention is directed to the provision of improved means and method of measuring or otherwise determining characteristics such as speed, frequency and/or other similar or allied functions or characteristics.

The device described and illustrated herein as representative of this invention provides new and useful improvements in the fields of electric current frequency measurement and of timepiece rate testing devices. It provides means whereby the sounds of a timepiece may be changed to electrical impulses of such a frequency and nature as to permit a quick, accurate, and simple determination of the rate of the timepiece by providing stabilizing means in the form of a mechanical vibrator so designed as to allow it to be readily driven off its natural vibration frequency and thereby make it readily responsive to control by an electric current of a frequency regulated by the sounds of a timepiece and which may or may not depart from the natural frequency of the vibrator.

It provides electrical frequency comparison means in the form of a differential device jointly operated by a given and a regulated frequency with means to clutch an indicator into operative relation with the differential device for a desired period of time only and automatic means operable when desired, for returning the indicator to effective zero position.

It provides means whereby a timepiece may be tested in any one of a universal series of positions while maintaining unchanged the position of the timepiece on its immediate support so that the timepiece need only be adjusted once with respect to its support and thereafter the support itself may be adjusted to locate the timepiece in the desired different positions of test. This readily permits accuracy and uniformity of comparison of varying positional tests made on different timepieces.

It provides a rate testing device which is automatic to such an extent as to go into action simply by pressing a button and thereafter to automatically carry out the test for a predetermined period of time, including, when needed, automatic time delay means to enable the timepiece and testing device to become stabilized and synchronized, means to indicate the start and finish of the test, means for stopping the operation of the device and maintaining the reading of the test result, and warning means to indicate when and if the timepiece is flagrantly off rate.

These and other advantages make this invention new and useful and set out a considerable forward step in frequency comparison and timepiece rate testing devices and methods. With the use of the device of this invention timepiece rate testing and particularly testing of cased wrist watchs is so simplified as to permit the simultaneous carrying out of a plurality of tests on different machines and watches by one operator as well as the use of comparatively unskilled operators. The device and method of this invention finds an important place in the manufacture of watches, particularly in administering a final check on the rate of cased watches.

The rate of a watch is tested, in the device embodying this invention, by causing one motor to be operated in step with the ticks of the watch, and another to be operated at a standard speed, and by comparing the speeds of the motors.

The watch ticks operate the motor by first being picked up by a microphone and translated into direct current pulses. These pulses operate a mechanical vibrator which stabilizes the pulses. The output of the vibrator is then made to operate a synchronous electric motor so the speed of the motor is dependent upon the frequency of the watch ticks.

At the same time another synchronous motor is operated at an effectively constant speed. The motors are linked so as to produce a differential speed in a device which operates an indicator. This indicator accordingly, by the extent of its movement in a given time, indicates the difference in speed of the motors and, therefore, the relative rate of the watch, and by the direction of its movement, which motor is faster and therefore whether the watch under test is fast of slow with respect to an effective constant.

The operation of the device is automatically controlled and carried out. When a watch is first positioned on the microphone, a momentary starter switch is pressed. This puts into operation a delay system which permits the watch and testing device a predetermined period of time in which to become stabilized and synchronized. The delay system thereafter energizes a timing cycle system which automatically carries out the test over a given period of time, and automatically stops the test when the period is over.

After the watch has been on the microphone a sufficient length of time to become stabilized and synchronized with the testing system, a short cut starting switch may be used, thus operating the timing cycle system directly, without using the delay system.

Referring to Fig. I the device embodying the invention includes a source 1 of electric current having a standard or effectively constant frequency and a microphone unit 2 which is adapted to pick up the sound vibrations of a watch and translate them into electrical impulses. The current from the standard source 1 preferably 60 cycles, is made to operate a standard frequency motor 3, see Fig. IV, preferably at 1800 R. P. M. The electrical impulses from the microphone 2 are passed through an amplifier 3a and a grid controlled gaseous discharge thyratron type tube 4. The output of the thyratron type tube is then made to operate a mechanically vibrating stabilizer reed system 5. See Figs. I, II, and XVIII. This output of this reed arrangement is passed through an amplifier and direct pulse producer 6 whose output, preferably 30 pulses per second, in turn is made to operate a watch motor 7. See Figs. III and IV. Thus the watch motor is operated at a rate dependent upon the frequency of the sounds or ticks of the watch. The standard motor 3 and the watch motor 7 are so linked as to operate the differential indicator system 8, which, as seen in Fig. IV, includes a rotor 106, linked with motors 3 and 7 only by magnetic force, and drive wheel 107 driven by rotor 106 and adapted to drive indicator dial 108 when clutch 15 operates under the action of its solenoid 45.

The differential indicator system 8 is controlled through a control system which includes two starting switches. These are the delay switch 9 and the short cut switch 10, and the mechanical set-up for these is shown in Fig. XVI. Use of either of these switches will energize the timing cycle system 11. When the delay switch 9 is operated it energizes the time delay system 12 which automatically operates for a given period of time and thereafter energizes the timing cycle system 11. As is indicated in Fig. I, when the short cut switch 10 is operated the timing cycle system 11 is directly energized and the time delay system 12 is not operated.

The delay switch 9 is used when the watch is first put on the microphone and the time delay system 12 is thereby operated in order to give the watch and the testing circuit an opportunity to become stabilized and synchronized. The short cut switch 10 is used when the watch is already on the microphone and is merely being moved to a different position or when it is known to be already stabilized.

The timing cycle system 11 operates a brake 13 to hold or release the indicator 108, a zero return device 14 comprising solenoid 46, cam 109, and lever 110, as shown in Fig. V, which when energized, automatically returns the indicator 108 to its effective zero position, a clutch 15 which moves the indicator into or out of operative relation with the rotor 106, and a timing cycle indicator 16 which designates the start and finish of the test period, and which includes a pilot light 43, Figs. III and IV. This timing cycle indicator 16 is also operated by the time delay system 12 and when the time delay system is de-energized after the energizing of the timing cycle system 11, the control of the timing cycle indicator 16 is dropped from the time delay system 12 and is taken over by the timing cycle system 11.

The stop and overbank drop out system 17 is initially energized by the timing cycle system 11 and is thereafter controlled by the nature of the output of the amplifier in the block 6 of Figs. I and II and it includes a dial light 96a which goes out if the test is not going right.

The control system is notable in that the control moves from point to point, that is, the delay switch 9 is a momentary switch and it merely energizes the time delay system 12 and then drops out of operation. The time delay system in turn energizes the timing cycle system 11 and then drops out of operation. This is also true of the short cut switch 10. The time delay system and the timing cycle system both operate themselves for a given period of time and then drop out automatically. This is also the case in the operation of the drop out system 17 which is initially energized by the timing cycle system 11 and thereafter operates itself as long as the output of the amplifier block 6 is maintained within given limits.

An important feature of this invention is the stabilization of the electrical impulses which are formed when the device picks up the ticks of the watch. The sound vibrations which originate in the so called "tick" and "tock" of a watch or timepiece are not in all cases produced at regularly spaced intervals and therefore the electrical impulses which are formed when these sounds are picked up by a microphone are not produced at regular, equally spaced intervals. In order to get an accurate test of the rate of a watch it is essential that the electrical impulses brought about from the watch sounds be regular and produced at equally spaced, stabilized intervals.

This stabilization is accomplished in this invention by utilizing a mechanical vibrator 19, see Figs. II and XVIII, with this vibrator so formed and/or adjusted as to have a calculated natural vibrating frequency of its own. This frequency is carefully calculated to a small multiple of the frequency of electrical impulses governed by the sounds of an accurately operating timepiece. The vibrator is so formed as to be readily driven off its natural vibrating frequency so that variation in the frequency of the electrical impulses in the output of the microphone will so control the vibration of the reed as to keep it in step with the frequency of the watch sounds. In this manner the sounds of the watch control the vibration of the reed and the vibration of the reed stabilizes and makes uniform the electrical impulses caused by the sounds of the watch.

The watch motor energizing system is illustrated in Fig. II with the microphone 2 and amplifier 3a and thyratron type tube 4 leading up to the reed system 5 and with the output of the reed going through the amplifier and direct current producer 6 to operate the watch motor 7. The output of block 4 periodically energizes an electromagnet 18 and since the reed 19 is fixedly supported at its end 20 and is free to vibrate throughout the remainder of its extent and since the free end 21 of the reed 19 is of magnetic material and is, in its position of rest, at a point to one side of the core 22 of the electromagnet 18, when the electromagnet is energized the reed 19 will be pulled sideways and its vibration started or maintained. The reed 19 has fixed transversely thereon a permanent magnet 23 which moves with the reed when it vibrates and each end thereof moves through one of a pair of pick up coils 24 and the movement of the permanent magnet 23 through the coils 24 produces electrical impulses in step with the vibration of the reed and therefore the sounds of the watch and these impulses are produced at effectively equally spaced intervals certain of which are varied by corrective impulses impressed on the electromagnet in accordance with the timepiece operation.

The pulses which energize the electromagnet 18 are impressed thereon at regular but differently spaced intervals in accordance with the sounds of the watch. It is this irregularity which is stabilized and made uniform by the operation of the vibrator reed 19. This reed has essentially the operation of the balance wheel of a watch and the electromagnet 18 has essentially the operation of an escapement of a watch, that is, the reed 19 vibrates through its own inertia and gets intermittent energizations from the electromagnet which are such as to keep the reed vibrating and in step with the watch sounds. The movement of the reed, however, is uniform so that its output is in the form of equally spaced electrical pulses, with periodic phase changes.

In order to give the reed the greatest possible energization with the power available the free end 21 thereof is placed close to the electromagnet 18, and in order to give the permanent magnet 23 the greatest possible movement through the pickup coils 24, it is positioned on the reed 19 close to the free end 21. This arrangement brings the coil of the electromagnet 18 into relatively close positional relation with the pickup coils 24 so that there is an electrical linkage between the electromagnet 18 and the pickup coils 24 which is undesirable since if unchecked it would introduce irregularities into the output of the reed system. Accordingly, a balance circuit is set up with a take off from the coil of the electromagnet 18 which directly feeds sufficient current into the pickup coils 24 to offset the current in the coils resulting from the above mentioned undesirable linkage. This balancing effect is made adjustable through variable rheostats 25.

Referring to Fig. III the timing device is brought into general energization by a main switch which energizes the standard frequency motor 3 through its input 26, the 110 volt A. C. source 27, and the 6 volt D. C. source 28.

The main control divisions of the control system are illustrated in Fig. III and are in areas enclosed by dotted lines. The time delay system 12 (Fig. I) comprises the time delay relay system 29 and the time delay motor system 30. The relay system comprises the relay 31 and associated switches 32, 33, and 34. These switches are shown in the positions they hold when the relay 31 is deenergized, that is, 32 and 33 are open and 34 is closed. Similarly throughout Fig. III, the switches are shown in the positions they hold when their associated relays are not energized. The above mentioned switches as well as those adjacent and operated by cams, are in the positions, and the cams are in the positions, which they hold when the systems are ready to start a test.

In the motor system 30, cams 31a and 32 are operated by the delay motor 33a.

The timing cycle system 11 (Fig. I) comprises the timing cycle relay system 34a and the timing cycle motor system 35 and in the timing cycle motor system 35 the cams 36 and 37 are operated by the timing motor 38.

The stop and overbank drop out system 17 (Fig. I) includes control system 39 with transformer 40, rectifier tube 41 and relay 42 with its associated switches.

When the rate testing device is set and ready for action the main pilot light 42a is on, indicating the general energization of the device, the time cycle pilot light 43 is on, indicating that neither delay nor timing systems are operating, the dial light 96a is out, indicating that the overbank and timing relays are not energized and no test is being carried out, the standard frequency motor 3 is going, the watch frequency motor 7 is not yet energized, the time delay motor 33a and the time cycle motor 38 are both stopped, the brake 13 is on and holding the indicator dial 108, and the brake solenoid 44 is not energized. The clutch 15 is disengaged so that the indicator dial is not being driven and the clutch solenoid 45 is not energized. The set back device 14 is out of operation and its solenoid 46 is not energized so that the indicator dial may or may not be at its effective zero position. The overbank device 17 is out of operation and its solenoid 42 is not energized.

The situation is then that the standard frequency motor 3 is running and it is driving a shaft 120, through magnet connections, which operates a gear wheel 107 preparatory to clutching in with the indicator dial 108. The indicator dial at this point is not driven.

The time delay button is pressed so as to close switch 9 and the time delay motor, its cams and associated switches go into action. The time cycle pilot light 43 is put out by this action. When the time delay cycle is over the main cycle has automatically been started, and the time cycle pilot light remains out. The set back and the overbank relays 46 and 42 are briefly energized when the main cycle is started by energizing the main relay 47, that is, for a short preparatory period just prior to the actual timing period. The overbank relay 42 is then kept energized by a holding switch 48 but the set back is released after the short preparatory period by deenergizing solenoid 46. At the start of the actual timing period the brake is released by energizing its solenoid 44 and this frees the indicator dial for rotation. At the same time the clutch is operated by energizing its solenoid 45 so that the indicator dial is connected with the rotating drive shaft. When the overbank relay 42 is energized at the start of the brief preparatory period the watch motor 7 is put into operation and is kept in operation, barring reed amplitude variation beyond given limits, throughout the preparatory and actual timing periods.

At the end of the actual timing period the time cycle pilot light 43 goes on, the clutch and brake solenoids 45 and 44 are deenergized so that the indicator dial is no longer driven through the clutch and the dial is held in its test result indicating position by the brake. The overbank relay 42 and therefore the watch motor remains in operation just as long as the reed amplitude remains within the proper limits. The overbank relay 42 may be made to release by removing the watch from the microphone or by changing the position of the watch in such a way as to cause it to overbank or operate sufficiently erratically to vary the reed amplitude and thereby deenergize the relay 42 and stop the watch motor 7.

The time delay system is started by closing the switch between contacts 49 and 50. It will be seen that the side 51 of the time delay relay 31 connects directly to contact 52 of the 6 volt source 28. The side 53 of the time delay relay 31 connects with contact 54 of the 6 volt source 28 through switch 55 in the delay motor system 30, across poles 50 and 49, through switch 56 in the timing relay switch system 34, through switch 57 of cam 36 of the timing motor system 35, and directly to contact 54.

Energizing the delay relay 31 opens switch 34 and closes switches 33 and 32. Switch 32 keeps relay 31 energized when the momentary switch 9 of contacts 49 and 50 is released. It will be seen that the side 53 of the delay relay 31 in this instance is connected to the contact 54 of the 6 volt source 28 through switch 55, then directly to the switch 32 and thereafter through switches 56 and 57 as before. The closing of switch 33 puts the time delay motor 33a into operation. The contact 58 of this motor is connected directly to contact 59 of the 110 volt source 27. The contact 60 of this motor is connected to contact 61 of the 110 volt source 27 through switch 33 and then direct. In opening switch 34 the time cycle pilot light 43 is put out since side 62 of this light is connected to contact 52 of the 6 volt source 28 directly except for passing through switch 34 and that side 63 of the pilot light 43 is connected to contact 54 of the 6 volt source 28 through switch 64 of cam 37 of the timing motor 38, and through switch 65 of the timing relay system 34.

The delay motor 33a rotates its cams 32 and 31a in a counter-clockwise direction when set up in the arrangement as shown in the diagram. The rotation of cam 32 causes the closing of switch 66 and with this connection made, the delay motor 33a will keep going regardless of switch 33 as long as cam 32 keeps switch 66 closed, so that even though the delay relay 31 is deenergized, and switch 33 opened, the delay motor 33a keeps going since the side 60 instead of being connected through switch 33 now is connected to switch 66 and thereafter direct to contact 61 of the 110 volt supply 27.

Cam 31a, of delay motor system 30, in being rotated holds switch 55 closed for the time delay period desired, which is, preferably, 12 seconds, although any other desired period may be used.

At the end of this time the finger 67 drops over shoulder 69 of cam 31a and switch 55 is opened and switch 68 is simultaneously closed. The action of the opening of switch 55 is to deenergize the delay relay 31 since the switch 55 is in the line between the side 53 of the delay relay 31 and the contact 54 of the 6 volt source 28. It will be seen that the action of the deenergizing of the delay relay 31 is as follows: The holding switch 32 is opened so that the relay 31 is no longer held in energized relation and will not again become energized until the switch connecting the starting contacts 50 and 49 is again closed, providing the timing relay system 34 is not operating at the time of closure of said switch, in which case closing switch 9 will have no effect. The switch 33 is opened and this has no immediate effect. However, it does mean that when cam 32 is so rotated as to open switch 66 the delay motor 33a will stop, since its original starting switch 33 is now open. Switch 34 is now closed and this closing would ordinarily light the time cycle pilot light 43 but since the switch 68 (cam 31a) has been closed and the timing relay 47 accordingly energized, switch 65 of the main timing relay system 34 is open and since this is in the line from the side 63 of the pilot 43 the pilot remains out.

The main timing starting relay 47 is now energized, the time delay relay 31 deenergized, and the time delay motor 33a still running, because the switch 66 is closed through the action of cam 32. The reason for keeping the motor and cam 32 operating is to reset cams 32 and 31a to starting position and as soon as this position is reached on the cams, that is, the position as shown in Fig. III, the switch 66 is opened by the dropping of finger 70 over shoulder 71 of cam 32 and the time delay motor 33a is stopped. At the same time switch 55 is closed so that the time delay relay 31 may again be energized when starting contacts 49 and 50 are connected, and switch 68 is opened. This, 68, is the energizing switch for the main starting relay 47.

The side 72 of the timing relay 47 is connected to contact 52 of the 6 volt source 28 through contact 34 of the delay relay system 31. Incidentally, the main starting relay 47 cannot be energized while the time delay relay 31 is energized since in that case switch 34 is open. The side 73 of the timing relay 47 is connected to contact 54 of the 6 volt source 28 through switch 68 of cam 31a when closed, and through switch 57 of cam 36 of the timing motor 38. When the main starting relay 47 is energized it is held in that state by switch 74 when closed irrespective of switch 68 so that switch 68 may be closed only briefly and may subsequently open, as it does, without deenergizing the main starting relay 47.

With switch 74 closed, side 72 of the timing relay 47 is still connected to contact 52 of the 6 volt source 28 in the same way, but side 73 is connected to contact 54 of the 6 volt source 28 through switch 74 and thereafter through switch 57 as before.

The main starting relay 47 is now energized and since switch 56 is accordingly opened, the time delay relay 31 is thus prevented from operating since switch 56 is in the line between side 53 of the time delay relay 31 and contact 54 of the 6 volt source 28 as described above. It has been shown that switch 74 is the holding switch for the main starting relay 47 and this is now closed. Switch 75, which is now closed, energizes and starts the main time cycle motor 38. The side 76 of the time cycle motor 38 is connected directly to contact 59 of the 110 volt source 27. Side 77 is connected to contact 61 of the 110 volt source 27 through switch 75, when closed.

While the main starting relay 47 has been shown as being energized through the switch 68 it is pointed out that this is the manner of its energization only when the time delay relay 31 is utilized and first energized. The main starting relay 47 may be energized directly by closing the switch between the short cut starting contacts 78 and 79. In this case, the time delay relay 31 being deenergized, switch 34 is closed, and side 72 of the main starting relay is connected to contact 52 of the the 6 volt source 28 through the closed switch 34. Side 73 of the main starting relay 47 is connected to the contact 54 of the 6 volt source 28 across the contacts 78 and 79 of the short cut switch 10, and through switch 57 of cam 36 of the timing motor 38, so that the main starting relay 47 may be energized either by connecting short cut contacts 78 and 79, or by closing switch 68 as long as switch 34 is closed in either instance, that is, as long as the delay system 29 is not operating.

Switch 79 (timing relay system 34) is now open but its opening has no immediate effect on the system. This switch is used later in combination with switch 80 of cam 37 to operate the brake solenoid 44. Switch 81 is now closed and therefore the brake solenoid 44 is energized and the brake is off, that is, the indicator dial 108 is released so that it may rotate. The brake solenoid 44 is energized since its side 82 is directly connected with contact 52 of the 6 volt source 28 and side 83 is connected with contact 54 of the 6 volt source 28 through switch 81. Switch 65 is now open and this has no immediate effect although it is, later, when closed, used as a part of the line used to energize the clutch solenoid 45. Switch 84 is closed and the set back solenoid 46 is accordingly energized. Side 85 of the set back solenoid 46 is connected directly to contact 52 of the 6 volt source 28 and side 86 thereof is connected to contact 54 of the 6 volt source 28 through switch 84, since it is now closed.

Switch 87 is now closed and this causes the overbank relay 42 to be energized. The side 88 of the overbank relay 42 is connected directly to contact 89 of the watch motor input 90 and the side 91 of the relay 42 is connected to the contact 92 of the watch input 90 through switch 87, of the timing relay system 34, when closed, through rectifier tube 41 by way of resistor 93 and plate outlet 94. The overbank relay 42 being energized, switches 48, 95, and 96 are closed. Switch 48, being closed, acts as a holding switch to keep the relay 42 energized. Side 88 is now still connected directly to contact 89 of the input 90 and side 91 is still connected to contact 92 of the input 90 but it now connects through switch 48 and tube 41 instead of switch 87. Switch 95 is now closed and this lights the dial light 96a. It will be seen that this light is connected directly across the line of the main pilot light 42a which receives its power, as does the filament of the tube 41, from the drop out transformer 40, which is energized directly from the 110 volt source 27. Thus if the overbank relay 42 is deenergized for any reason the dial light 96a goes out. Switch 96 is now closed and accordingly the watch controlled motor 7 is energized. Side 97 of this motor is connected directly to contact 98 of the watch motor power input 90, and side 99 is connected to contact 92a of the input 90 through closed switch 96.

The purpose of the rectifier tube 41 is to produce direct current to operate the overbank relay 42 under the control of the reed amplitude. The alternating current output of the amplifier of the block 6 in Fig. I is tapped to supply the input to the overbank relay 42 through the rectifier 41 across input contacts 89, 92 and 98. Accordingly, if the amplitude of vibration of the reed 5 falls below a given limit the overbank relay 42 is deenergized and the dial light 96a goes out as a warning that the test is not being properly carried out.

The amplitude of the reed falls below the limit necessary to keep the overbank relay energized when the flow of timepiece sounds is non-uniform or non-existent as is the case respectively when the timepiece overbanks or stops.

If desired, the rectifier tube 41 and transformer 40 may be dispensed with by taking the power for the overbank relay 42 from the output of the 30 D. C. pulse portion of the block 6 of Fig. I.

Returning to the main starting relay 47, this is now energized and its various switches are positioned and have their functions as described above, one of which is the starting of the time cycle motor 38. This motor drives cams 37 and 36. Cam 36 is so formed that after a brief period, preferably 6 seconds, although any other desired period may be arranged, switch 57 is opened when finger 102 drops over shoulder 103. This has the immediate effect of deenergizing the main starting relay 47. When this happens the main timing cycle (preferably 30 seconds) begins. Switch 87 is opened and this makes the overbank relay 42 dependent entirely upon the closed switch 48 to keep it energized. Switch 84 is now open and this deenergizes the set back solenoid 46 and takes the set back out of operation thus leaving the indicator dial 108 free to rotate from effective zero.

Before switch 57 is opened, cam 37 causes switch 100 to close, switch 64 to open and switch 80 to close. Switch 100 keeps the time cycle motor 38 running in spite of the fact that switch 75 has now opened due to the deenergizing of the main relay 47. In this connection it will be seen that side 77 of the motor 38 is now connected to contact 61 of the 110 volt source 27 through switch 100 (cam 37) so that the motor 38 continues to operate in spite of the fact that the main relay 47 has been deenergized. Switch 64, now open, causes the time cycle pilot light 43 to remain out, in spite of the fact that switch 65 (relay 47) which ordinarily would light this pilot light, is now closed, that is, side 63 of the time cycle pilot light 43 is now prevented from being connected with contact 54 of the 6 volt source 28 by the fact that switch 64 is open. If switch 64 were closed and the main relay 47 deenergized the pilot light 43 would light since side 63 would then connect with contact 54 of the 6 volt source 28 through switch 64, and switch 65. Switch 80 is now closed. This has the effect of keeping the brake solenoid 44 energized and the brake off.

The side 83 of the brake is now connected to contact 54 of the 6 volt source 28 through closed switch 79, closed switch 80, and closed switch 65. Therefore, the brake remains off with its solenoid 44 energized in spite of the fact that switch 81 on which it previously depended is now open. Switch 80 being closed causes the clutch solenoid 45 to be energized and the indicator dial 108 to be connected with the differential rotating drive shaft 128 which now, since both the standard frequency motor 3, and watch motor 7 are operating, expresses the differential between the speeds of these motors. Therefore, the clutch 15 brings the indicator dial 108 into operation just for the timing (30 second) period. With switch 80 closed the side 101 of the clutch solenoid is connected directly to contact 52 of the 6 volt source 28 and side 102 is connected to contact 54 of the 6 volt source 28 through closed switch 80, and closed switch 65.

The time cycle motor 38 continues its operation regardless of the fact that the main starting relay 47 has been deenergized and the switch 75 opened, through the holding switch 100 under the controlling action of its cam 37. After a desired time period has passed, for instance, the 30 seconds which is preferable for an actual testing period, cam 37 causes switch 100 to be opened again when finger 104 drops over shoulder 105, switch 64 to be closed and switch 80 to be opened. The opening of switch 100 stops the time cycle motor 38 since 100 is the holding switch for that motor when the main relay 47 is deenergized. Switch 64, now closed, lights the time cycle pilot light 43 indicating the end of the timing period. Switch 80, now open, causes the clutch solenoid 45 to be deenergized and the clutch thereby released so as to stop the driving of the indicator dial, and also causes the brake solenoid 44 to be deenergized and thus permits the brake to operate under the action of its solenoid spring 127, Fig. IV, and hold the indicator dial 108 in the position it has reached under the differential action of the standard frequency and watch motors 3 and 7.

At the same time cams 36 and 37 have been brought around to starting position as shown in Fig. III, so that when the main starting relay 47 is again energized the entire system is ready to repeat the test.

Mechanical portions of the control arrangements include the momentary switch arrangement of Fig. XVI which shows the set up of the delay starting switch 9 and the short cut switch 10. This arrangement comprises a pair of micro switches 111 which are fixed to a plate 112 by means of screws 113. The micro switches 111 are so positioned on the plate 112 that their contacts 114 are disposed in opposite and aligned relation with each other between the micro switches. A rotatable shaft 115 extends between the micro switches and above their contacts and is rotatably supported in a pair of upright posts 116. A blade member 117 is supported by the shaft 115 and extends downwardly therefrom between the micro switches 111. The blade 117 has a pair of contact members 118 thereon in alignment with the contacts 114 of the micro switches so that when the shaft 115 is rotated in its supports 116 one of the contacts 118 is pressed against its adjacent micro switch contact so as to make the desired connection.

The blade 117 is secured to the shaft 115 at a point removed from the micro switch contacts 114 and extends in substantially free resilient relation from its connection to the shaft 115 to the contacts 114 so that there is a resilient action in the finger 117 when the shaft 115 is so turned as to press one of the contacts 118 against its adjacent micro switch contact 114. The shaft 115 supports a yoke 119 which turns with the shaft and is so positioned as to hit against the plate 112 when the shaft has been rotated a small amount. This yoke provides a safety factor which prevents excess pressure being exerted on the micro switch contacts 114. The shaft 115 also supports a yoke 120 having a finger piece 121 on each end thereof to provide a direct and simple method of turning the shaft in order to operate one or the other of the switches.

When switch 9 is operated the time delay motor system 30 is energized. This system is illustrated in Fig. X and comprises a motor 33a, and cams 31a and 32 with their associated switches 66, 68 and 55. The cams 31a and 32 are rotated by the motor 33a in the direction of the arrow 122 so that the fingers 70 and 67 move in and out of the cam recesses provided by the shoulders 71 and 69.

In the course of its operation the time delay motor system 30 causes the time cycle motor system 35 to be energized and the mechanical portions of this system are illustrated in Fig. XI wherein is shown the motor 38, cams 36 and 37 and their associated switches 57, 100, 64 and 80. The cams 36 and 37 are rotated by the motor 38 in the direction of the arrow 123 through the action of gears 124 and 125. These gears are so calculated and formed as to rotate the cams at just the desired speed to carry out the timing cycle of the test in the time required to rotate the cams the amount necessary to operate the switches.

The brake device is illustrated in Fig. IV and comprises solenoid 44 with brake 13 having a pointed end 126 which is adapted to contact the dial indicator 108 under the action of spring 127 when the solenoid 44 is not energized.

The clutch arrangement is also illustrated in Fig. IV and this functions to operatively connect the dial indicator 108 with the rotor 106 associated with the watch motor 7 during the timing period of the device. The rotor 106 drives shaft 128 which in turn drives gear members 129, and 107 and shaft 130 to which is rigidly connected a clutch member 131 which accordingly rotates with the rotor 106 of the watch controlled motor 7. The indicator dial 108 is mounted for free rotation on the shaft 130 and is adapted to be operatively connected with and rotate with rotor 106 when the clutch arm 132 is moved about its pivot 133 under the action of the clutch solenoid 45.

This movement of the clutch arm 132 causes the indicator dial 108 to move longitudinally of the shaft 130 and to bring the clutch face 133a into contact with the rotating clutch member 131 so as to cause the indicator dial 108 to rotate in accordance with the movement of the rotor 106. The clutch arm 132 has pin members 134 extending therethrough which when the solenoid 45 is actuated are caused to press against a sleeve 135 which in turn bears on a ball race 136. The sleeve 135 is accordingly stationary and the remainder of the ball race 136 and the clutch face 133a are rotated when the clutch is actuated. The indicator dial 108 is connected to the clutch face 133a through a bushing 137 by means of pins 138 having a spring member 139 between their heads and the bushing 137 so that it will be seen that the indicator dial 108 is resiliently connected to the sleeve 137 and the clutch 15.

The zero return system is illustrated in Fig. V and comprises a heart shaped cam 109 which is mounted so as to rotate freely on the shaft 130 and rigidly with the indicator dial 108 so that movement of the heart shaped cam about the shaft 130 will correspondingly move the indicator dial 108. The heart shaped cam 109 is operable by means of a lever 110 pivotly supported on an upright 140 and having a roller 141 adapted to contact the periphery of the cam 109. The lever 110 has a plunger member 142 pivotly connected thereto with the lower end of the plunger adapted to be acted on by the set back solenoid 46. When the indicator dial 108 is free to rotate about the shaft 130 actuation of the set back solenoid 46 will cause the lever 110 to be pulled down and the roller 141 to press on the periphery of the heart shaped cam 109 so as to rotate that cam until the roller 141 rests in the zero position 143 of the cam. A keeper member 144 in the form of a resilient spring is so positioned as to resist the movement of the roller 141 past the high spot of the cam so that a resilient deterrent to the complete rotation of the cam and indicator dial is thus provided.

In each of the solenoids as described there is a spring member to push the actuating arm out of the solenoid when the solenoid is not actuated. The spring member of the set back solenoid 46 is illustrated at 145. That of the brake solenoid is illustrated at 127 in Fig. IV and that of the clutch solenoid is illustrated at 146 in Fig. IV.

The microphone assembly, see Figs. XII–XV, comprises a shaft 147 rotatably supported on a plate 148. At the forward end of this shaft is mounted, in fixed relation so as to be rotatable with the shaft, a yoke member 148a substantially semi-circular in shape and extent with said mounting to the shaft being located substantially centrally of this semi-circle and secured by a nut 149 or similar suitable holding means. At each end of the yoke 148 is mounted an inwardly extending bearing member 150, each of which is in alignment with the other. Supported on these bearing members is a cup like member 151 which is mounted on said bearings for rotation within the yoke and about an axis at substantially right angles to that about which the yoke itself is movable. It will be seen, therefore, that the cup like member 151 is so arranged as to have a universal movement.

Within the cup member is a piezo-electric crystal 152 which is supported in the cup 151 on sponge rubber or other suitable resilient mountings 153, see Fig. XV.

There are two wires attached to this crystal, one of which (154) is connected directly to the bottom of the cup as a ground. This ground follows the various bearings and supports to the casing of the assembly. The other wire 155 is the one which picks up the electrical impulses of the crystal 152 and this wire extends through one of the cup bearings 150 to one end 158 of the yoke 148. This wire 155 is connected in its cup bearing 150 to a hairspring 157 (Fig. XIII) providing a "pigtail" type of connection one end of which is attached to the above mentioned wire and the other to a wire leading back in a recess 156 of the yoke to the yoke support and rearwardly through the supporting shaft 147 to a contact ring 159 mounted on the rear of the shaft 147.

The spring 157 is mounted so as to be effectively concentric with the cup bearing 150 through which the pick-up wire 155 extends.

The cup 151 has a metal cover 160 with flanges 161 to fit within the cup and with these flanges recessed at diametrically opposed points to receive the bearings 150.

The cover 160 has a felt pad 162 on the top thereof and both pad and cover are centrally perforated. This perforation contains a headed pin 163 with the head at the lower end of the pin and lying within the cup in contact with the crystal 152. The assembly of this cup is such that this pin extends slightly above the felt surface. At one side of the cup on the outside there is mounted a blade spring 164 which extends upwardly and then forwardly and downwardly to overlie the top of the cup and the upwardly extending end of the pin member 163.

In operation, the spring 164 is lifted and a watch is inserted beneath it in such a manner that the spring bears on the watch which in turn contacts the upper end of the pin and forces the headed end of the pin against the crystal.

The function of the spring 157 is to permit the rotation of the cup 151 on its bearings while the electrical contact from the crystal is maintained without twisting of a wire. On the bearing 150 opposite that containing the spring there is mounted a stop pin 165 which may be made to contact a second stop pin 166 which is mounted on the yoke 148 in order to prevent the continuous turning of the cup on its bearings in one direction sufficiently to wind or unwind the spring too great an extent.

The same bearing which supports the stop pin has indexing means associated therewith so that the cup in its rotation may be quickly and readily moved to different positions. This indexing means consists of V slots in the bearing 150 and a single ball 167 housed in a recess in the end of the yoke 148. The resilience of the yoke is utilized to force the ball member into each of the slots as the cup is rotated on its bearings 150 and the ends of the yoke are forced apart a slight amount when the cup is turned and the ball bears on such points of the cup bearing as are not slotted.

The spring member 164 for holding the watch on the face of the microphone is so contoured as to prevent the turning of the cup more than an amount sufficient to obtain the desired positions, by contacting the central part of the yoke 148, and acts as a stop in the same way as the previously mentioned stop pins do and for the same reason, namely, to prevent damage to the hairspring.

The supporting shaft 147 for the yoke member is hollow and the wire extending from the microphone crystal extends through the center of this shaft and is attached to the contact slip ring 159 mounted on the rear of the rotatable shaft 147 and insulated therefrom by means of a plastic disc 168. The disc 168 and slip ring 159 are mounted on a supporting metallic ring 169 which is rigidly mounted on the hollow shaft 147. The hollow shaft is indexed in its rotation in a manner similar to the indexing of the rotation of the cup member, that is, there are slots in the shaft and a spring pressed ball 170 mounted within the plate to operate the indexing.

The electrical impulse from the crystal 152 is picked up from the slip ring 159 by means of a spring pressed plunger 170a which rides continually on the periphery of the slip ring. This plunger is mounted in a casing which is in turn supported on the plate 148. The impulses picked up by this spring pressed plunger are thereafter directly routed by cable to the amplifier unit 3, see Fig. I.

The reed 19 of the vibrator unit 5 is further illustrated in Fig. XVIII in which is shown the electro magnet 18, the reed member 19 with its fixed end 20 and the pick up coils 24. The reed is so formed as to vibrate at a particular natural frequency and in order to enable it to do this it has a relatively thin portion 171 adjacent its fixed end 20. Also in order to provide an adjustment of the period of vibration of the reed a slidable weight member 172 is mounted on the reed 19 for movement longitudinally thereof and is provided with a set screw 173 in order to hold it in adjusted position.

The standard frequency motor 3 and the watch motor 7 are linked as is illustrated in Figs. IV and V through a shaft 174 which is broken in Fig. V so that only the watch motor 7 is shown. The shaft 174 is driven by the standard motor 3 at the standard frequency. This shaft extends through the motor 7 and has attached at its outer end an assembly comprising a pair of magnetizable poles 175 which are attached directly to the outer end of the shaft, an insulating member 176 which rotates with the shaft and the magnetizable member 175 and a second set of magnetizable poles 177 which are in the form of a ring but which have no direct magnetizable connection with the shaft 174 although they rotate with it and in fixed relation with magnetizable poles 175 due to the insulating connection member 176. At a point on the shaft 174 spaced from its free end and adjacent the standard motor 3 is attached a cup like member 178 which rotates with the shaft. The annular edge of this cup like member lies in substantial alignment with the annular ring 177 and is separated therefrom by a supporting plate 179. This plate is stationary so that the annular member 177 and the cup 178 rotate on on either side of it. Both the cup member 178 and the support of the coil 180 as well as the ring of the magnetizable poles 177 are slotted to prevent eddy current action.

The plate 179 rigidly supports the driving coil 180 of the watch motor 7 in fixed position within the cup member 178, and plate 179 is magnetizable.

The action of the watch motor 7 is as follows:

The input derived from the ticks of the watch is impressed upon the coil 180 and this in turn sets up a polarity in the shaft 174 which is being driven by the standard motor 3. One pole is at the forward end of the shaft and gives one polarity to the poles 175 and the other pole is at the rear end of the shaft but is carried around through the cup member and made to jump the gaps between the cup member 178, the pole member 177 and the fixed plate 179 so that pole pieces 175 and 177 are given opposite and intermittent polarity, with the frequency of their energization being controlled by the ticks of the watch. The rotor 106 is mounted within the opening formed by the pole members 175 and 177 free of any connection with the watch motor 7 other than the magnetic connection between its permanently magnetic poles 131 and the poles 175 and 177 of the watch motor. See Figs. VII–IX.

The motion of the rotating poles 175 and 177 combined with the frequency of the watch tick governed impulses on those poles creates such an attraction for the rotor 106 as to hold that rotor stationary providing that the frequency of the watch tick governed impulses has the effect of driving the watch governed motor at the same speed as the standard motor. In the event that the speeds are different the rotor 106 will rotate at a rate depending upon the difference and in a direction depending upon whether the watch governed impulse frequency is such as to effectively drive the watch governed motor faster or slower than the standard motor.

Thus the rotor 106 driving the shaft 128 expresses the differential between the speed of the watch tick frequency governed motor and that of the standard motor. The rotor is formed, as is illustrated in Fig. VIII, of a central composite permanent magnet 182 and separate poles 181 which are pressed thereon through the action of a cup like holding member 183. As indicated in Fig. VII like poles in this permanent magnet are diametrically opposite each other.

The frequency of watch ticks is normally five per second. In order to drive a motor by these watch ticks it is first necessary to change the sounds of the ticks to electrical impulses and then to amplify the impulses to a sufficient strength to operate the motor and simultaneously to increase the frequency sufficiently to operate the motor.

The sound of the watch ticks is picked up by the microphone so that the microphone output is direct current pulses at the rate of five per second. These pulses are amplified and made to operate the thyratron type tube which accomplishes further amplification. The vibrator reed is given a natural period of 15 cycles per second. This is made to vibrate by the energization of the electromagnet with the periodic output of the thyratron tube so that the reed vibrates several times in between each impulse from the electromagnet. The reed is so formed that the impulses in the electromagnet may momentarily retard or accelerate the vibration of the reed so that the alternating current output of the reed is changed in phase upon the changing of the vibration of the reed. The electromagnet accordingly not only drives the reed but also periodically changes its vibration to bring it in step with the watch ticks.

The nature of the electrical pulses in the system prior to the reed may be described as a uniform series of repeatedly occurring pulses with each pulse spaced a different amount from its preceding adjacent pulse and the pulses of the output of the electromagnet may be described as a uniform series of groups of pulses with each group comprising equally spaced pulses and when the watch is off time, with each group spaced from its preceding group a different amount than from its following group.

The function of the reed is to multiply the frequency of the electrical impulses derived from the watch ticks and to effectively iron out irregularities in spacing between the watch ticks. The natural vibration period of the reed is such as to average out variations in spacing and yet the reed is so formed as to permit such temporary change in its vibration under the action of the watch tick pulses on the electromagnet as to change the phase of the alternating current 15 cycle output of the reed sufficiently to keep the reed output in step with the ticks of the watch.

The reed output is alternating current at 15 cycles per second. This is subjected to full wave rectification so as to produce direct current at 30 pulses per second. The pulses of this 30 pulse direct current are peaked for maximum efficiency and then are impressed upon field poles of the watch tick governed motor. There are four poles, one at each of the points of the compass and the diametrically opposite poles are alike in their polarity. The rotor operating between these poles also has four poles of which the diametrically opposite are alike.

The watch motor 7, is accordingly a non self starting synchronous motor which will run at 1800 R. P. M. on 60 cycle A. C., that is, the rotor 106 and the field poles 175 and 177 will have a relative speed of 1800 R. P. M., while the rotor 106 may or may not be moving.

The watch motor 7 will run at its normal speed on half rectified A. C. In place of the wave form of half wave A. C. the motor has been found to operate efficiently on 30 cycle D. C. pulses.

The requirements of the device of this invention are such that the motor will run under these conditions since the limits to which the reed may be varied from its natural vibration are less than the limits within which the motor will run.

It is to be understood that many variations in the actual values given, such as frequencies and time periods, may be used without departing from the spirit of the invention.

What I claim is:

1. In a device of the character described, a differential device adapted to be operated jointly by a current of a given frequency and one of regulated frequency, an indicator adapted to register the result of the operation of said differential device, automatic delay means adapted to maintain said indicator in inoperative relation with said differential device for a controlled period of time, automatically operated means adapted to link and maintain said indicator in operative relation with said differential device for a controlled period of time, means for positively holding said indicator in its final position and means for releasing said holding means.

2. In a timing apparatus, a rotatable member, means for rotating said member at a speed dependent on the error in the rate of a device being timed, an indicator, means for coupling said indicator to said member, means for automatically uncoupling said indicator at the end of a predetermined time interval, and means operated automatically preliminary to a second coupling operation for restoring said indicator.

3. In a timing apparatus, an indicator, a member which is rotated at a speed dependent on the error in the rate of a device being timed, means including a clutch magnet for coupling said indicator to said member, a restoring magnet, means including a switch for energizing said restoring magnet, a timing device started by the operation of said switch, and means including said device for automatically deenergizing said restoring magnet, for energizing said clutch magnet, and for deenergizing said clutch magnet after a predetermined time.

4. A watch timing apparatus operating through a predetermined cycle having means for converting the sounds of a timepiece into alternating current having a phase comparable with the timepiece sounds, a source of alternating current of a given frequency, means for producing a second alternating current, a differential device operable jointly by said first alternating current and said second alternating current, a differential indicator adapted to register the result of the operation of said differential device, means adapted to link said differential device and said differential indicator for a controlled period of time, a cycle indicator adapted to indicate the start and finish of said controlled period of time, locking means adapted to hold said differential indicator in its registering position, means for returning said differential indicator to effective zero position and warning means operable upon the variation of the second alternating current beyond given limits.

WILLIAM OGLE BENNETT, Jr.

REFERENCES CITED

The following references are of record in the file of this patent:

UNITED STATES PATENTS

| Number | Name | Date |
|---|---|---|
| 1,022,593 | Pratt | Apr. 9, 1912 |
| 1,159,040 | Joleen | Nov. 2, 1915 |
| 1,272,692 | Mather et al. | July 16, 1918 |
| 1,345,539 | Fynn | July 6, 1920 |
| 1,447,969 | Dietrich | Mar. 13, 1923 |
| 1,544,989 | James | July 7, 1925 |
| 1,560,056 | Horton | Nov. 3, 1925 |
| 1,566,879 | Karapetoff | Dec. 22, 1925 |
| 1,695,051 | Marrison | Dec. 11, 1928 |
| 1,711,101 | Shanck | Apr. 30, 1929 |
| 1,727,328 | Affel | Sept. 10, 1929 |
| 1,769,988 | Davis | July 8, 1930 |
| 1,794,502 | Turner | Mar. 3, 1931 |
| 1,902,650 | Legg | Mar. 21, 1933 |
| 1,967,072 | Young | July 17, 1934 |
| 2,035,759 | Poole | Mar. 31, 1936 |
| 2,036,444 | Tolson | Apr. 7, 1936 |
| 2,058,616 | Norrman | Oct. 27, 1936 |
| 2,077,390 | Blau | Apr. 20, 1937 |
| 2,140,601 | Serriere | Dec. 20, 1938 |
| 2,148,678 | Blau et al. | Feb. 28, 1939 |
| 2,154,701 | Ruspoli | Apr. 18, 1939 |
| 2,155,646 | Fetter et al. | Apr. 25, 1939 |
| 2,188,059 | Norrman et al. | Jan. 23, 1940 |
| 2,200,604 | Hicks | May 14, 1940 |
| 2,241,589 | Feldhausen | May 13, 1941 |

FOREIGN PATENTS

| Number | Country | Date |
|---|---|---|
| 382,470 | Germany | Oct. 3, 1923 |